United States Patent [19]

Makinae et al.

[11] Patent Number: 5,166,003
[45] Date of Patent: Nov. 24, 1992

[54] PLATED ARTICLES

[75] Inventors: Hisayoshi Makinae; Ryoji Handa; Katsuo Ushizako, all of Toyohashi; Hideyuki Fujii, Tokyo, all of Japan

[73] Assignee: Mitsubishi Rayon Co., Ltd., Tokyo, Japan

[21] Appl. No.: 634,515

[22] Filed: Dec. 27, 1990

[30] Foreign Application Priority Data

Dec. 28, 1989 [JP] Japan .................................. 1-343779

[51] Int. Cl.$^5$ ............................................ B32B 15/08
[52] U.S. Cl. ..................................... 428/458; 428/462
[58] Field of Search ......................................... 428/457

[56] References Cited

FOREIGN PATENT DOCUMENTS

| 0056243 | 7/1982 | European Pat. Off. . |
| 0183167 | 6/1986 | European Pat. Off. . |
| 53-6374 | 5/1978 | Japan . |
| 53-6376 | 9/1978 | Japan . |
| 54-15966 | 1/1979 | Japan . |
| 58-149924 | 12/1983 | Japan . |
| 61-253370 | 9/1986 | Japan . |
| 61-253371 | 11/1986 | Japan . |

OTHER PUBLICATIONS

Patent Abstracts of Japan, vol. 8, No. 85 (C-219)[1522], 18 Apr. 1984, (Abstract of Japanese Patent 6250).
Chemical Abstracts, vol. 91, No. 16 15 Oct. 1979, p. 32, abstract No. 124396g, of Japanese patent 57563.

*Primary Examiner*—Thomas J. Herbert, Jr.
*Attorney, Agent, or Firm*—Oblon, Spivak, McClelland, Maier & Neustadt

[57] ABSTRACT

A plated article comprising a molded article having a metal coating deposited thereon, the molded article being formed of a resin composition consisting essentially of 10 to 90% by weight of a polybutylene terephthalate resin and 90 to 10% by weight of an ABS resin containing 5 to 70% by weight of a rubber component composed mainly of polybutadiene, which plated article has excellent thermal resistance, mechanical strength and solvent resistance.

4 Claims, No Drawings

PLATED ARTICLES

BACKGROUND OF THE INVENTION

1. Field of the Invention

This invention relates to plated articles formed of a resin composition consisting of a polybutylene terephthalate resin and a specific ABS resin, and having excellent thermal resistance, mechanical strength and solvent resistance.

2. Description of the Prior Art

Molded articles formed of polybutylene terephthalate resins (hereinafter referred to as PBT resins) have been widely used as electrical parts, automobile parts and the like, because of their excellent mechanical properties, electrical properties and thermal resistance. However, molded PBT articles have the disadvantage that they are difficult to plate and this limits their range of application. In order to overcome this disadvantage, a number of methods have been proposed. They include the method of treating the surface of a molded PBT article with an alkaline solution prior to plating (Japanese Patent Laid-Open Nos. 6374/'78, 6376/'78 and 15966/'79), the method of treating a molded PBT article with a chromic acid solution prior to plating (Japanese Patent Laid-Open No. 149924/'83), and the method of treating a molded PBT article with both an alkaline solution and a chromic acid solution prior to plating (Japanese Patent Laid-Open Nos. 253370/'86 and 253371/'86). However, these methods are still disadvantageous in that they complicate the manufacturing process and it is difficult to put them into practice.

On the other hand, ABS resins have excellent platability and comprise the greater part of the resins used for plating purposes. However, ABS resins have the disadvantage that their poor solvent resistance limits their range of application and their lack of thermal resistance makes it very difficult to use them at relatively high temperatures of 90° C. or above.

SUMMARY OF THE INVENTION

It is an object of the present invention to provide plated resinous articles having excellent thermal resistance, mechanical strength, solvent resistance and platability.

According to the present invention, there is provided a plated article comprising a molded article having a metal coating deposited thereon, the molded article being formed of a resin composition consisting essentially of (A) 10 to 90% by weight of a polybutylene terephthalate resin and (B) 90 to 10% by weight of an ABS resin containing (B-1) 5 to 70% by weight of a rubber component composed mainly of polybutadiene.

DETAILED DESCRIPTION OF THE PREFERRED EMBODIMENTS

The PBT resin (A) used in the present invention is a polymer obtained by effecting an esterification reaction or ester exchange reaction between a dicarboxylic acid component comprising at least 90 mole % of terephthalic acid or a derivative thereof, and a diol component comprising at least 90 mole % of 1,4-butanediol, and then subjecting the resulting product to polycondensation. Useful derivatives of terephthalic acid include dialkyl esters of terephthalic acid diaryl esters of terephthalic acid, and the like.

Other dicarboxylic acids which can be used as a portion of the dicarboxylic acid component in an amount of less than 10 mole % include phthalic acid, isophthalic acid, adipic acid, sebacic acid, naphthalene-1,4- or -2,6-dicarboxylic acid, diphenyl ether-4,4-dicarboxylic acid, and the like.

Other diols which can be used as a portion of the diol component in an amount of less than 10 mole % include ethylene glycol, propylene glycol, neopentyl glycol, cyclohexanedimethanol, 2,2-bis(4-hydroxyphenyl)propane, polyethylene glycol, polytetramethylene glycol, and the like.

Other components which can be used in preparing the PBT resin (A) include oxyacids such as p-hydroxybenzoic acid and p-hydroxyethoxybenzoic acid.

The content of the PBT resin (A) should be in the range of 10 to 90% by weight based on the total weight of the resin composition. If the resin composition has a PBT resin content of less than 10% by weight, molded articles formed thereof will have poor thermal resistance and solvent resistance. If the resin composition has a PBT resin content of greater than 90% by weight, molded articles formed thereof will have poor platability. Preferably, the content of the PBT resin (A) is in the range of 20 to 80% by weight based on the total weight of the resin composition.

The ABS resin (B) used in the present invention consists essentially of a rubber component (B-1) composed mainly of polybutadiene, an acrylonitrile component and a styrene component. The rubber component (B-1) composed mainly of polybutadiene is contained therein in an amount of 5 to 70% by weight and preferably 5 to 30% by weight. Exemplary acrylonitrile component includes acrylonitrile and methacrylonitrile. Exemplary styrene component includes styrene, α-methyl styrene, p-methyl styrene and p-t-butyl styrene.

The rubber component (B-1) composed mainly of polybutadiene can be polybutadiene, a butadiene/styrene copolymer, a butadiene/acrylonitrile copolymer or the like.

Typically, the ABS resin can be prepared by subjecting monomers such as acrylonitrile and styrene to emulsion polymerization in the presence of a polybutadiene latex or a styrene/butadiene copolymer latex, coagulating the resulting product, and drying the coagulum; or by melt blending an acrylonitrile/styrene copolymer with an acrylonitrile/butadiene copolymer. However, various other methods may be used to prepare the ABS resin. Thus, the ABS resin used in the present invention is not limited by specific methods for preparing it. The ABS resin may additionally contain minor amounts of monomers other than those described above, including N-substituted maleimides, (meth)acrylic esters, vinyl chloride, vinylidene chloride, vinyl acetate, vinyl propionate, acrylic acid and its esters, and the like. Especially where the ABS resin contains an N-substituted maleimide, the resulting resin composition will preferably show an improvement in thermal resistance.

The content of the ABS resin (B) should be in the range of 10 to 90% by weight based on the total weight of the resin composition. If the resin composition has an ABS resin content of less than 10% by weight, molded articles formed thereof will have poor platability. If the resin composition has a ABS resin content of greater than 90% by weight, molded articles formed thereof will have poor thermal resistance and solvent resistance. Preferably, the content of the ABS resin (B) is in the range of 20 to 80% by weight based on the total weight of the resin composition.

The content of the rubber component (B-1) composed mainly of polybutadiene should be in the range of 5 to 70% by weight based on the ABS resin (B). If the resin composition consists of an ABS resin having a rubber component content of less than 5% by weight, molded articles formed thereof will have poor platability. If the resin composition consists of an ABS resin having a rubber component content of greater than 70% by weight and a PBT resin, molded articles formed thereof will have liability to aggregation of the rubber component and hence poor platability. From the viewpoint of platability, the content of the rubber component (B-1) composed mainly of polybutadiene is preferably in the range of 5 to 30% by weight.

The weight ratio of acrylonitrile component to styrene component in the ABS resin is preferably in the range of 15/85 to 40/60. If the resin composition consists of an ABS resin having a weight ratio of acrylonitrile component to styrene component of less than 15/85, molded articles formed thereof will show poor adhesion of the metal coating deposited thereon. If the resin composition consists of an ABS resin having a weight ratio of acrylonitrile component to styrene component of greater than 40/60, molded articles formed thereof will undergo a significant discoloration during the molding process.

If desired, the resin composition used in the present invention can further contain various suitable additives such as flame retardants, auxiliary flame retardants, modifiers, mold release agents, light stabilizers, heat stabilizers, reinforcing fillers, dyes and pigments. The addition of reinforcing fillers is especially preferred because they bring about an improvement in rigidity and thermal resistance. In addition, the resin composition can also contain minor amounts (i.e., up to about 20% by weight based on the total weight of the resin composition) of other thermoplastic resins (e.g., olefin resing such as polyethylene, polypropylene and ethylene copolymers, acrylic resins, fluororesins, polyamides, polyacetals, polycarbonates, polysulfones, polyphenylene oxides, polyester elastomers and MBS resin (polybutadiene grafted with styrene and methyl methacrylate)) and/or thermosetting resins (e.g., phenolic resins, melamine resing, polyester resins, silicone resins and epoxy resins).

In preparing the resin composition used in the present invention, there may be used any conventional machine for use in resin blending, such as a Henschel mixer or tumbler. In forming this resin composition into molded articles, there may be used any conventional machine for use in molding, such as single-screw extruder, twin-screw extruder or injection molding machine.

In order to plate the resulting molded resin articles, they are preferably subjected to a sequence of steps including etching, catalyzing, acceleration, electroless plating and electroplating steps. However, the present invention is not limited thereto.

No particular limitation is placed on the material of the metal coating constituting the plated articles of the present invention. The material may be selected from a variety of metals such as nickel, chromium, gold, silver, copper, conbalt, iron, cadmium and titanium. Moreover, the thickness of the metal coating may vary from 0.02 $\mu$m to 1 mm, depending upon the intended use of the plated article and the material of the metal coating. Furthermore, the plated articles of the present invention need not have a metal coating deposited on the whole surface of the molded resin article, but may have a metal coating deposited on at least a part of the surface of the molded resin article.

Because of their excellent thermal resistance, mechanical strength and solvent resistance, the plated articles of the present invention are suitable for use in applications including external and internal trim parts of automobiles, electric and electronic parts such as connectors, capacitor cases and key tops, and EMI shields for office automation equipment such as personal computers, facsimiles and telephone sets. Moreover, they can also be effectively used in other fields of application in which it has heretofore been impossible to use such plated articles.

The present invention is further illustrated by the following examples. In the examples and comparative examples given below, all parts and percentages are by weight. In these examples and comparative examples, various properties were evaluated according to the following procedures.

(1) Heat distortion temperature
Heat distortion temperature was measured according to ASTM D-648.

(2) Flexural modulus
Flexural modulus was measured according to ASTM D-790.

(3) Solvent resistance
Solvent resistance was evaluated according to JIS K-7114.

Specifically, a specimen measuring 50 mm ×90 mm ×3 mm (thickness) was molded at a mold temperature of 60° C. and a cylinder temperature of 250° C. (a resin temperature of 260° C.) and then plated under the plating conditions given below. The resulting plated specimen was soaked in regular gasoline at room temperature for 7 days and then examined for change in appearance.

Change in appearance
○—No change.
△—Surface roughening.
x—Whitening and surface roughening.

Plating conditions
Etching: Treated with an etching solution (containing 400 g/l of $CrO_3$ and 20 vol. % of $H_2SO_4$) at 60° C. for 15 minutes.
Pickling: Treated with a pickling solution (containing 10 vol. % of HCl) at room temperature for 1 minute.
Catalyzing: Soaked in a catalyzer bath (Catalyst A-30; manufactured by Okuno Seiyaku Kogyo K.K.) at 20° C. for 2 minutes.
Acceleration: Soaked in an accelerator bath (containing 10 vol. % of $H_2SO_4$) at 40° C. for 3 minutes.
Electroless copper plating: Soaked in an electroless copper plating bath (N-100; manufactured by Okuno Seiyaku Kogyo K.K.) at 30° C. for 10 minutes.
Copper electroplating: Plated in a copper electroplating bath [containing 200 g/l of copper sulfate, 50 g/l of $H_2SO_4$ and 1 ml/l of a brightener (Cabarazide; manufactured by Shoering Co.] at 20° C. for minutes, using a current density of 4 A/dm$^2$.
Baking: Heated at 80° C. for 2 hours.

(4) Adhesion strength of metal coating
A plated specimen similar to that used for the evaluation of solvent resistance was prepared. After a cut of 2.5 cm width was made in the metal coating, it was pulled up vertically. The force required to peel it off was measured and expressed in kg/cm.

EXAMPLES 1-8 AND COMPARATIVE EXAMPLES 1-4

(1) Preparation of graft copolymer (B-I)

80 parts (on a solid basis) of a polybutadiene latex having a solid content of 50% was charged into a reaction vessel. Then, 50 parts of distilled water, 2 parts of a wood rosin emulsifier, 0.02 part of sodium hydroxide and 0.35 part of dextrose were added thereto with stirring. Immediately after that, a mixture composed of 5 parts of acrylonitrile, 15 parts of styrene, 0.2 part of cumene hydroperoxide and 0.5 part of tert-dodecyl mercaptan was continuously added dropwise thereto over a period of 90 minutes. Thereafter, the reaction mixture was allowed to stand for an hour and then cooled. The resulting graft copolymer latex was coagulated with dilute sulfuric acid, washed, filtered and dried to obtain graft copolymer (B-I)

(2) Preparation of graft copolymer (B-II)

Graft copolymer (B-II) was prepared in the same manner as described above for graft copolymer (B-I), except that 70 parts (on a solid basis) of the polybutadiene latex used in the preparation of graft copolymer (B-I) was used in combination with the graft monomers shown in Table 1.

(3) Preparation of graft copolymer (B-III)

Graft copolymer (B-III) was prepared in the same manner as described above for graft copolymer (B-I), except that 30 parts (on a solid basis) of the polybutadiene latex used in the preparation of graft copolymer (B-I) was used in combination with the graft monomers shown in Table 1.

(4) Preparation of graft copolymer (B-IV):

Graft copolymer (B-IV) was prepared in the same manner as described above for graft copolymer (B-I), except that 10 parts (on a solid basis) of the polybutadiene latex used in the preparation of graft copolymer (B-I) was used in combination with the graft monomers shown in Table 1.

(5) Preparation of copolymer (b-I) to (b-III)

Copolymers having the respective compositions shown in Table 1 were prepared according to the suspension polymerization method.

The aforesaid graft copolymers (B-I) to (B-III) and copolymers (b-I) to (b-III) were mixed with polybutylene terephthalate ($[\eta]=1.15$) in the proportions shown in Table 1. These resin compositions were blended in a Henschel mixer for 5 minutes and then pelletized by means of a twin-screw extruder having a screw diameter of 30 mm. Using these pellets, various properties of the resin compositions were evaluated according to the above-described procedures. The results thus obtained are also shown in Table 1.

EXAMPLES 9-12

The aforesaid polybutylene terephthalate, graft copolymers (B-I), copolymers (b-I), chopped and milled glass fiber of 3 mm length (abbreviated as GF in Table 2), a filler (talc having a particle diameter of 5 μm) and a flame retardant (a brominated epoxy resin having a molecular weight of 4,000) were mixed in the proportions shown in Table 2. These resin compositions were pelletized in the same manner as in Example 1. Using these pellets, various properties of the resin compositions were evaluated according to the above-described procedures. The results thus obtained are also shown in Table 2.

TABLE 1

|  |  |  |  |  | Example 1 | Example 2 | Example 3 | Example 4 | Example 5 | Example 6 |
|---|---|---|---|---|---|---|---|---|---|---|
| PBT resin (A) (parts) |  |  |  |  | 30 | 50 | 70 | 50 | 50 | 50 |
| ABS resin (B) (parts) | B-I | Polybutadiene, 80 parts | Graft monomer, 20 parts | AN, 5 parts; St, 15 parts |  |  |  |  |  |  |
|  | B-II | Polybutadiene, 70 parts | Graft monomer, 30 parts | AN, 8 parts; St, 22 parts | 15 | 10 | 6 | 10 | 10 |  |
|  | B-III | Polybutadiene, 30 parts | Graft monomer, 70 parts | AN, 20 parts; St, 50 parts |  |  |  |  |  | 50 |
|  | B-IV | Polybutadiene, 10 parts | Graft monomer, 90 parts | AN, 26 parts; St, 64 parts |  |  |  |  |  |  |
|  | b-I | AN, 29 parts; St, 71 parts |  |  | 55 | 40 | 24 |  |  |  |
|  | b-II | AN, 29 parts; α-MSt, 71 parts |  |  |  |  |  | 40 |  |  |
|  | b-III | AN, 20 parts; St, 50 parts; N-PMI, 30 parts |  |  |  |  |  |  | 40 |  |
|  | Content of rubber component in ABS resin (%) |  |  |  | 15.0 | 14.0 | 14.0 | 14.0 | 14.0 | 30.0 |
| Properties | Heat distortion temperature (4.6 kg/cm²) (°C.) |  |  |  | 95 | 100 | 118 | 105 | 108 | 95 |
|  | Flexural modulus ($\times 10^4$ kg/cm²) |  |  |  | 2.5 | 2.5 | 2.5 | 2.5 | 2.5 | 2.4 |
|  | Solvent resistance |  |  |  | ○ | ○ | ○ | ○ | ○ | ○ |
|  | Adhesion strength of metal coating (kg/cm) |  |  |  | 1.2 | 0.6 | 0.5 | 0.6 | 0.6 | 1.2 |

|  |  |  |  |  | Example 7 | Example 8 | Comparative Example 1 | Comparative Example 2 | Comparative Example 3 | Comparative Example 4 |
|---|---|---|---|---|---|---|---|---|---|---|
| PBT resin (A) (parts) |  |  |  |  | 50 | 50 | 50 | 50 | 95 | 5 |
| ABS resin (B) (parts) | B-I | Polybutadiene, 80 parts | Graft monomer, 20 parts | AN, 5 parts; St, 15 parts |  |  | 50 |  |  |  |
|  | B-II | Polybutadiene, 70 parts | Graft monomer, 30 parts | AN, 8 parts; St, 22 parts |  |  |  | 45 | 1 | 20 |
|  | B-III | Polybutadiene, 30 parts | Graft monomer, 70 parts | AN, 20 parts; St, 50 parts |  |  |  |  |  |  |
|  | B-IV | Polybutadiene | Graft | AN, 26 parts; | 50 |  |  | 10 |  |  |

TABLE 1-continued

|  |  | diene, 10 parts | monomer, 90 parts | St, 64 parts |  |  |  |  |  |  |
|---|---|---|---|---|---|---|---|---|---|---|
|  | b-I | AN, 29 parts; St, 71 parts |  |  |  | 5 | 40 | 4 | 75 |
|  | b-II | AN, 29 parts; α-MSt, 71 parts |  |  |  |  |  |  |  |
|  | b-III | AN, 20 parts; St, 50 parts; N-PMI, 30 parts |  |  |  |  |  |  |  |
|  | Content of rubber component in ABS resin (%) |  |  |  | 20.0 | 63.0 | 80.0 | 2.0 | 14.0 | 14.7 |
| Properties | Heat distortion temperature (4.6 kg/cm²) (°C.) |  |  |  | 98 | 92 | 89 | 105 | 140 | 93 |
|  | Flexural modulus (× 10⁴ kg/cm²) |  |  |  | 2.4 | 2.2 | 2.1 | 2.5 | 2.6 | 2.5 |
|  | Solvent resistance |  |  |  | ○ | ○ | ○ | ○ | ○ | x |
|  | Adhesion strength of metal coating (kg/cm) |  |  |  | 0.7 | 0.5 | (Note 1) | (Note 1) | (Note 1) | 1.2 |

(Note 1) The metal coating did not adhere partly.

TABLE 2

|  |  |  |  |  | Example 9 | Example 10 | Example 11 | Example 12 |
|---|---|---|---|---|---|---|---|---|
| PBT resin (A) (parts) |  |  |  |  | 30 | 30 | 30 | 30 |
| ABS resin (B) (parts) | B-II | Polybutadiene, 70 parts | Graft monomer, 30 parts | AN, 8 parts; St, 22 parts | 15 | 15 | 15 | 15 |
|  | b-I | AN, 29 parts; St, 71 parts |  |  | 55 | 55 | 55 | 55 |
|  | Content of rubber component in ABS resin (%) |  |  |  | 15.0 | 15.0 | 15.0 | 15.0 |
| GF |  |  |  |  | 30 |  |  | 30 |
| Filler |  |  |  |  |  | 30 |  |  |
| Flame retardant |  |  |  |  |  |  | 10 | 10 |
| Properties | Heat distortion temperature (4.6 kg/cm²) (°C.) |  |  |  | 110 | 103 | 98 | 115 |
|  | Flexural modulus (× 10⁴ kg/cm²) |  |  |  | 7.8 | 4.5 | 2.6 | 8.0 |
|  | Solvent resistance |  |  |  | ○ | ○ | ○ | ○ |
|  | Adhesion strength of metal coating (kg/cm) |  |  |  | 1.2 | 0.7 | 1.2 | 1.2 |
|  | Flame retardance (1/32", UL-94) |  |  |  | 94HB | 94HB | 94V-0 | 94V-0 |

What is claimed is:

1. A plated article comprising a molded article having a metal coating deposited thereon, the molded article being formed of a resin composition consisting essentially of (A) 10 to 90% by weight of a polybutylene terephthalate resin and (B) 90 to 10% by weight of an ABS resin containing (B-1) 5 to [70%] 30% by weight of a rubber component composed mainly of polybutadiene.

2. A plated article as claimed in claim 1 wherein the rubber component (B-1) composed mainly of polybutadiene is polybutadiene, a butadiene-styrene copolymer or a butadiene-acrylonitrile copolymer.

3. A plated article as claimed in claim 1 wherein the ABS resin (B) contains acrylonitrile and styrene and the weight ratio of acrylonitrile component to styrene component in the ABS resin (B) is in the range of 15/85 to 40/60.

4. A plated article as claimed in claim 1 wherein the resin composition comprises 20 to 80% by weight of the polybutylene terephthalate resin (A) and 80 to 20% by weight of the ABS resin (B).

* * * * *